(12) United States Patent
Kleven (10) Patent No.: US 7,724,001 B2
(45) Date of Patent: May 25, 2010

(54) CAPACITANCE SENSING CIRCUIT

(75) Inventor: Lowell A. Kleven, Eden Prairie, MN (US)

(73) Assignee: Rosemount Inc., Eden Prairie, MN (US)

( * ) Notice: Subject to any disclaimer, the term of this patent is extended or adjusted under 35 U.S.C. 154(b) by 525 days.

(21) Appl. No.: 11/728,354

(22) Filed: Mar. 26, 2007

(65) Prior Publication Data

US 2007/0227253 A1    Oct. 4, 2007

Related U.S. Application Data (60) Provisional application No. 60/786,984, filed on Mar. 29, 2006.

(51) Int. Cl.
  *G01R 27/26* (2006.01)
(52) U.S. Cl. .................... 324/679; 324/674
(58) Field of Classification Search ............ 324/674, 324/679
  See application file for complete search history.

(56) References Cited

U.S. PATENT DOCUMENTS

| | | | | |
|---|---|---|---|---|
| 3,646,434 A | * | 2/1972 | Norwich | 324/669 |
| 3,816,811 A | * | 6/1974 | Cmelik K. | 324/667 |
| 3,975,719 A | | 8/1976 | Frick | 340/200 |
| 4,381,677 A | | 5/1983 | Ruesch et al. | 73/718 |
| 4,519,253 A | | 5/1985 | Frick | 73/718 |
| 4,791,352 A | | 12/1988 | Frick et al. | 324/60 |
| 4,878,012 A | | 10/1989 | Schulte et al. | 324/60 |
| 5,083,091 A | | 1/1992 | Frick et al. | 324/678 |
| 5,119,033 A | | 6/1992 | Frick et al. | 324/607 |
| 5,329,818 A | | 7/1994 | Frick et al. | 73/708 |
| 6,516,672 B2 | | 2/2003 | Wang | 73/718 |
| 6,828,802 B2 | | 12/2004 | Schulte | 324/658 |
| 6,873,277 B1 | | 3/2005 | Frick | 341/143 |
| 2003/0020495 A1 | | 1/2003 | Andrade | 324/686 |
| 2004/0004488 A1 | | 1/2004 | Baxter | 324/678 |

FOREIGN PATENT DOCUMENTS

| | | |
|---|---|---|
| CN | 1132349 | 10/1996 |
| EP | 0711976 | 11/1994 |

OTHER PUBLICATIONS

"Low-Cost NV Digital POT WiperLock™ Technology" 2005 Microchip Technology Inc., pp. 1-6.
"Notification of Transmittal of the International Search Report and the Written Opinion of the International Searching Authority, or the Declaration" for PCT/US2007/007395, filed Mar. 26, 2007; 11 pages.
Office Action from corresponding European Application No. 07753978.1, dated Feb. 8, 2010.
Office Action from corresponding Chinese Application No. 200780018322.7, dated Jan. 22, 2010.

* cited by examiner

*Primary Examiner*—Vincent Q Nguyen
(74) *Attorney, Agent, or Firm*—Westman, Champlin & Kelly, P.A.

(57) ABSTRACT

A circuit that senses a process variable includes a voltage divider that includes first and second capacitances. At least one of the capacitances is varied by the process variable. Divider ends receive modulated potentials, and a divider center tap coupled to a detector. The detector has a detector output representing carrier frequency range components. A control circuit controls a baseband envelope of the modulated potentials as a function of the detector output.

16 Claims, 12 Drawing Sheets

CAPACITANCE SENSING CIRCUIT

CROSS-REFERENCE TO RELATED APPLICATION

The present application is based on and claims the benefit of U.S. provisional patent application Ser. No. 60/786,984, filed Mar. 29, 2006, the content of which is hereby incorporated by reference in its entirety.

BACKGROUND OF THE INVENTION

This invention relates to capacitive sensing circuit for process variables. As microstructure fabrication processes improve, capacitive sensors of process variables can be made in increasingly smaller sizes to reduce size and cost of products that include such capacitive sensors. As the size of capacitive sensors decrease, the rest capacitance is becoming increasingly smaller as well. Capacitive sensors with rest capacitances of about 15 pF, for example, can be constructed in layered sapphire structures, and without the use of dielectric oil to increase capacitance. With such small rest capacitances, stray capacitances that couple noise into the capacitive sensor become larger with respect to the rest capacitances. Signal-to-noise ratios are degraded, and noise becomes a significant part of total error in the sensor output. There is also increasing demand for improved accuracy in capacitive process sensors. As these demands increase, capacitive sensor non-linearity limits the error specifications of the sensor. A method and apparatus are needed to provide improved accuracy in capacitance sensors.

SUMMARY

Disclosed is a circuit sensing a process variable. The circuit comprises a voltage divider that includes first and second capacitors. At least one of the first and second capacitors has a capacitance that is varied by the process variable in a baseband frequency range.

The divider has divider ends that receive modulated potentials. The modulated potentials have modulation in a carrier frequency range. The modulated potentials have a baseband envelope. The divider has a center tap connection that provides a detector input.

The circuit comprises a detector with a detector output. The detector output represents carrier frequency range components of the detector input.

The circuit comprises a control circuit. The control circuit controls the baseband envelope of the modulated potentials as a function of the detector output. The control circuit provides a process variable output in the baseband frequency range.

In one embodiment, the sensing capacitance varies non-linearly with respect to the process variable. The control circuit controls at least one of the modulated potentials as a non-linear control function of the detector output. The non-linear control function compensates the process variable output for non-linearity with respect to the process variable.

DETAILED DESCRIPTION

In the embodiments described below, a process variable sensing circuit senses a process variable capacitively. The process variable sensing circuit comprises a sensing capacitor and a reference capacitor connected in series to form a capacitive voltage divider. The sensing capacitor senses variations in a process variable at baseband frequencies. The ends of the capacitive voltage divider receive modulated potentials that are modulated at a carrier frequency. The connection between the sensing capacitor and the reference capacitor provides a detector input. A detector circuit detects the detector input and provides a detector output. The detector circuit operates in a carrier frequency band and provides a detector output that is demodulated. A control circuit controls the amplitudes of the modulated potentials as a function of the detector output. The control circuit provides a process variable output at baseband frequencies.

The low level detector input is free of switch connections. The detector operates in a modulation frequency range and rejects noise outside the modulation frequency range. In one embodiment, the sensing capacitor is non-linear and one of the modulated potentials comprises a non-linear function of the detector output, compensating a portion of the non-linearity of the sensing capacitor. The circuit functions in a closed loop manner, such that the amplitudes of the modulated potentials change to drive the detector input to an average value near zero. The detector input comprises an error signal.

The term "detector" as used in this application refers to a circuit that receives a carrier modulated by baseband process variable variations, and that provides a detector output that reproduces the baseband process variable variations. The term "baseband" as used in this application refers to the frequency band occupied by the useful information in the process variable variations. The term "modulation" as used in this application refers to impressing baseband information on to the higher frequency carrier. The term "carrier" as used in this application refers to the frequency that is higher than the baseband frequencies, and which is used for modulation. The term "envelope" as used in this application refers to the baseband modulation waveform within which the carrier of an amplitude-modulated signal is contained; i.e., the curve connecting the peaks of successive cycles of the carrier wave.

Figure 1:
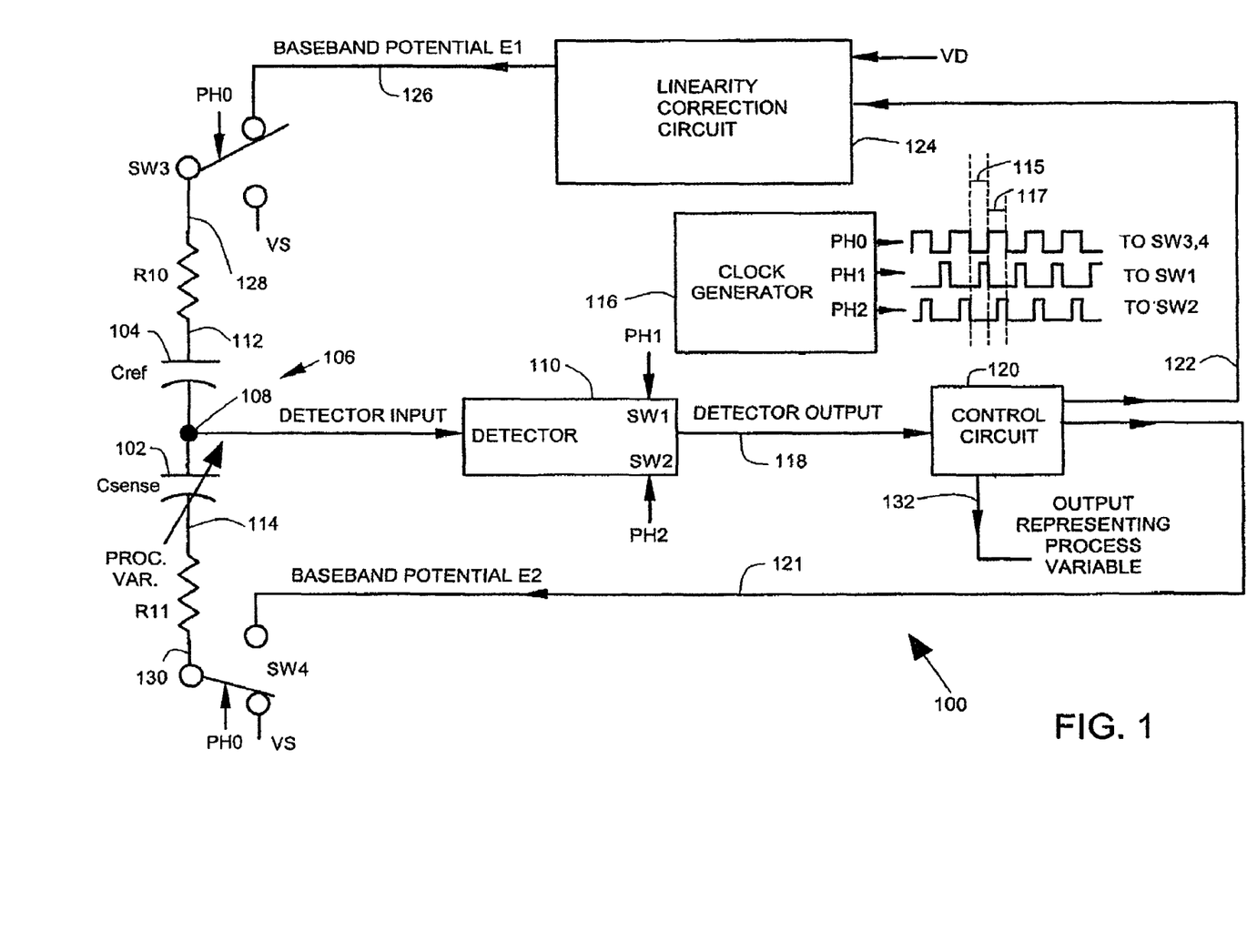
FIG. 1 illustrates a block diagram of a circuit that is useful for capacitive sensing of a process variable.

FIG. 1 illustrates a block diagram of a circuit 100 that is useful for capacitive sensing of a process variable. A first capacitor 102 has a capacitance (Csense) that varies as a function of the process variable. The process variable sensed can be pressure, force, acceleration, inclination, temperature or other process variable that can be sensed capacitively. A second capacitor 104 has a capacitance (Cref) that is substantially independent of the process variable that is sensed by first capacitor 102. In one embodiment, the capacitance Csense has a generally linear relationship to the sensed process variable, but is typically subject to a small amount of non-linearity. Variations in the process variable (and Csense) that carry useful information about the process variable are in a baseband frequency range. In one embodiment, the baseband frequency range is from 0 to 400 Hz.

In one embodiment, the capacitors 102, 104 are constructed to be similar to one another in terms of materials of construction and geometry so that the responses of first and second capacitors 102, 104 to undesired environmental effects are similar or track one another. In another embodiment, the capacitors 102, 104 are fabricated in a common support structure, enhancing tracking. In yet another embodiment, first capacitor 102 senses pressure and is fabricated with the second capacitor 104 in a common support structure formed of layers of sapphire that are directly bonded to one another.

The capacitors 102, 104 are connected in series to form a capacitive voltage divider 106. A divider connection 108 is a center tap that is common to both capacitors 102, 104. The connection 108 serves as a detector input to a detector circuit 110. A divider end conductor 112 of the capacitive voltage divider 106 is connected through resistor R10 to a switch SW3. A divider end conductor 114 is connected through resistor R11 to a switch SW4. The switches SW3, SW4 are single pole, double throw solid state MOS switches. The switch SW3 alternately couples the divider end 112 to baseband potential E1 on line 126 or to a reference potential VS. The switch SW4 alternately connects the divider end 114 to baseband potential E2 or to the reference potential VS. The reference potential VS is a reference for voltage measurement and is taken to be 0 volts.

The switches SW3, SW4 are controlled by a drive clock PHO that is generated by a clock generator 116. When the drive clock PHO is low during a first clock phase 115, the divider end 112 is coupled by switch SW3 to E1, and the divider end 114 is coupled by SW4 to VS as illustrated. When the drive clock PHO is high during a second clock phase 117, the divider end 112 is coupled by switch SW3 to VS, and the divider end 114 is coupled by SW4 to E2 (not illustrated).

The switches SW3, SW4 are in high voltage signal paths rather than low voltage signal paths. There are no switches connected to the low voltage detector input 108. This arrangement provides low noise compared to sigma-delta type architecture for measurement of capacitance sensors where low voltage signals are connected to switches.

When the drive clock PH0 is low during the first clock phase 115, the capacitive divider 106 is coupled between E1 and VS, and when the drive clock PH0 is high during the second clock phase 117, the capacitive divider 106 is coupled between VS and E2. Resistors R10, R11 limit peak currents after switching between drive clock phases. Resistors R10, R11 have resistance values that are high enough to limit peak currents, but low enough so that the detector input voltage at connection 108 settles to its final value during each clock phase. In one embodiment, the capacitances Csense and Cref are about 15 picofarads and the resistances R10, R11 are 300 ohms, and the drive clock PH0 has a frequency of 1 megahertz. This frequency of the drive clock is referred to as a carrier frequency.

During the first clock phase, the divider 106 divides the potential difference (E1–VS) between the divider end conductors 112, 114. During the second clock phase, the divider 106 divides the potential difference (VS–E2) between the divider end conductors 112, 114. The divider 106 provides divided potentials at the detector input 108. The detector input 108 is thus a series of pulses of alternating polarity (relative to VS). The detector input 108 is substantially a square wave at the carrier frequency. The peak-to-peak amplitude of the detector input 108 is a function of the capacitances Csense, Cref and the potentials E1, E2. The detector input 108 is a low level error signal that can have a poor signal to noise ratio relative to baseband noise and other noise outside the carrier frequency range.

The detector circuit 110 detects the detector input 108 in a bandpass around the carrier frequency. The detector circuit 110 provides a detector output 118 to a control circuit 120. The control circuit 120 generates the potential E2 as a function of the amplitude of the detector output 118. The control circuit 120 provides the potential E2 on line 121 to the switch SW4. The control circuit 120 provides an output representing the process variable on line 132. In instances where the capacitance Csense is non-linear, the control circuit 120 provides a control voltage on line 122 to a linearity correction circuit 124. The linearity correction circuit 124 generates the potential E1 as a function of the power supply voltage VD and the potential E2. The linearity correction circuit 124 provides the potential E1 on line 126 to the switch SW3. Variations in the potentials E1 and E2 are in the baseband frequency range. The switch SW3 provides a first modulated potential on line 128. The first modulated potential on line 128 has a peak amplitude (envelope) that is modulated by E1 at baseband frequencies and has a substantially fixed carrier frequency. The switch SW4 provides a second modulated potential on line 130 that has a peak amplitude (envelope) that is modulated by E2 at baseband frequencies and has a substantially fixed carrier frequency.

The clock generator 116 generates a first sampling clock PH1. The first sampling clock PH1 is high, as illustrated, during a latter portion of the first clock phase 115 of the drive clock PH0. The clock generator 116 generates a second sampling clock PH2. The second sampling clock PH2 is high, as illustrated, during a latter portion of the second clock phase 117 of the drive clock PH0. The sampling clocks PH1, PH2 are synchronized with the drive clock PH0. The first and second sampling clocks PH1 and PH2 couple to the detector 110, as illustrated. In one embodiment, the detector 110 utilizes the sampling clocks PH1, PH2 for synchronous demodulation. The synchronous demodulation strongly rejects noise that is not correlated with the drive clock.

The circuit 100 thus senses a process variable that varies the capacitance of the first capacitor 102. The circuit 100 provides a baseband output on line 132 that represents the sensed process variable. First and second capacitors 102, 104 receive first and second modulated potentials on lines 128, 130 with amplitudes E1, E2 that are modulated at a carrier frequency by switches SW3, SW4. The first and second capacitors 102, 104 couple to a detector input 108. One of the first and second capacitors 102, 104 has a capacitance that is varied by a process variable at baseband frequencies. The detector circuit 110 provides a detector output 118 that is representative of components of the detector input 108 that are detected in the carrier frequency range. The control circuit 120 controls baseband amplitudes E1, E2 of the modulated potentials 128, 130 as a function of the detector output 118. The control circuit 120 provides an output 132 representing the process variable at baseband frequencies. In one embodiment, the lines 132, 121, 122 are all connected to the baseband potential E2.

The relationship between baseband and carrier frequencies is described in more detail below in connection with an example illustrated in FIG. 2. The clock generator 116 is described in more detail below in connection with an example illustrated in FIG. 3. The detector circuit 110 is described in more detail below in connection with an example illustrated in FIGS. 4-5. The control circuit 120 is described in more detail below in connection with an example illustrated in FIG. 6. The linearity correction circuit 124 is described in more detail below in connection with an example illustrated in FIG. 7.

Figure 2:
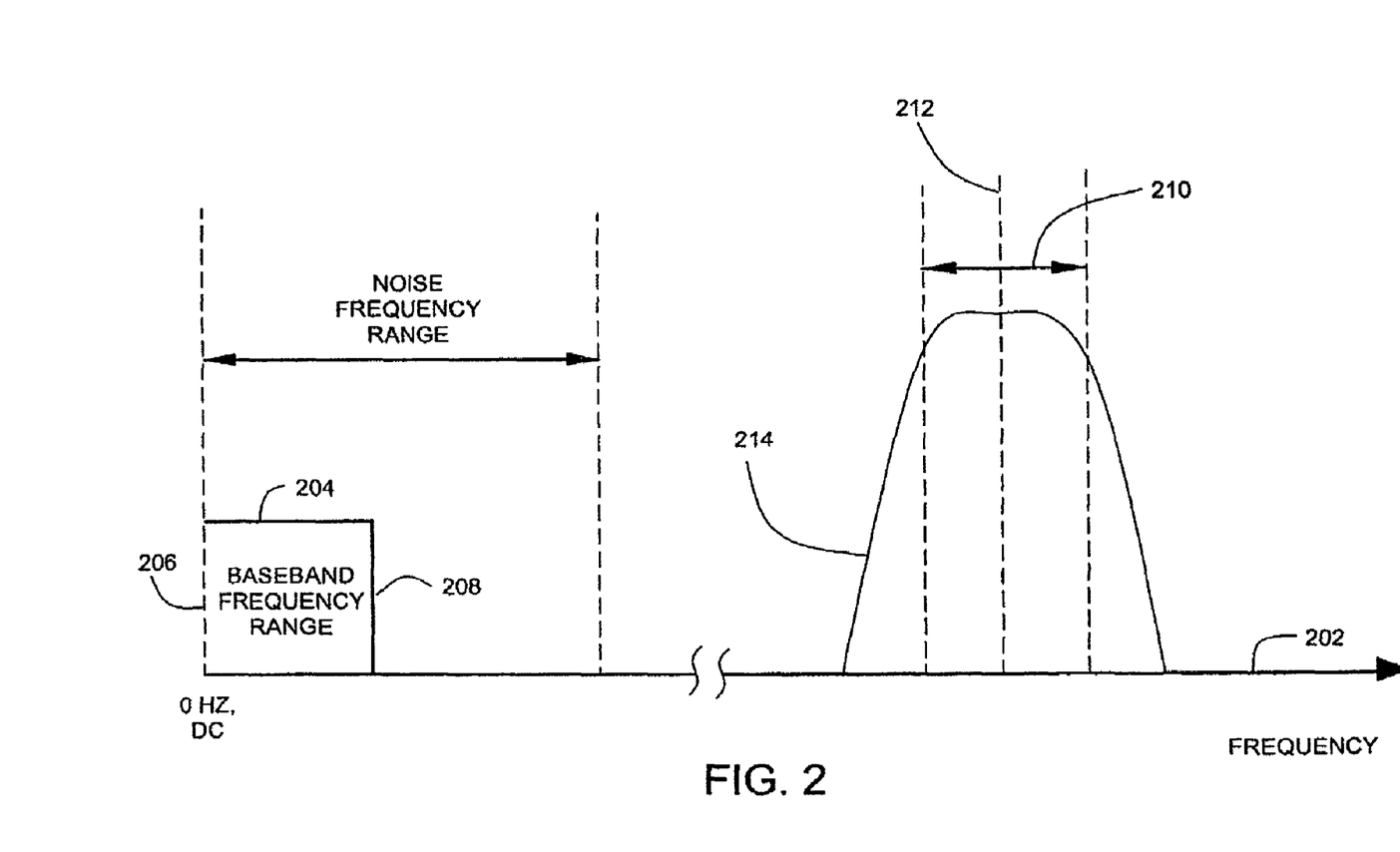
FIG. 2 illustrates an example of baseband and carrier frequency ranges.

FIG. 2 illustrates an example of baseband and carrier frequency ranges. In FIG. 2, a horizontal axis 202 represents frequency. Useful information in sensed process variables is in a baseband frequency range 204 that extends from 0 frequency (e.g., DC, steady process variable) at 206 up to an upper limit 208 of baseband frequency. Process variables sensed have useful information in the baseband frequency range. When baseband information is modulated with a carrier to produce a modulated potential, then useful information is in a modulation frequency range 210 that is generally centered about the carrier frequency 212. A detector (such as detector 110 in FIG. 1) has a frequency bandpass characteristic 214 that generally matches the modulation frequency range 210 as illustrated. The detector 110 detects the desired information in the detector bandpass 214, and rejects noise and baseband signals that are outside the detector bandpass 214. A detector output (such as detector output 118 in FIG. 1) is thus insensitive to most stray noise pickup by the sensor encountered in process environments.

Figure 3:
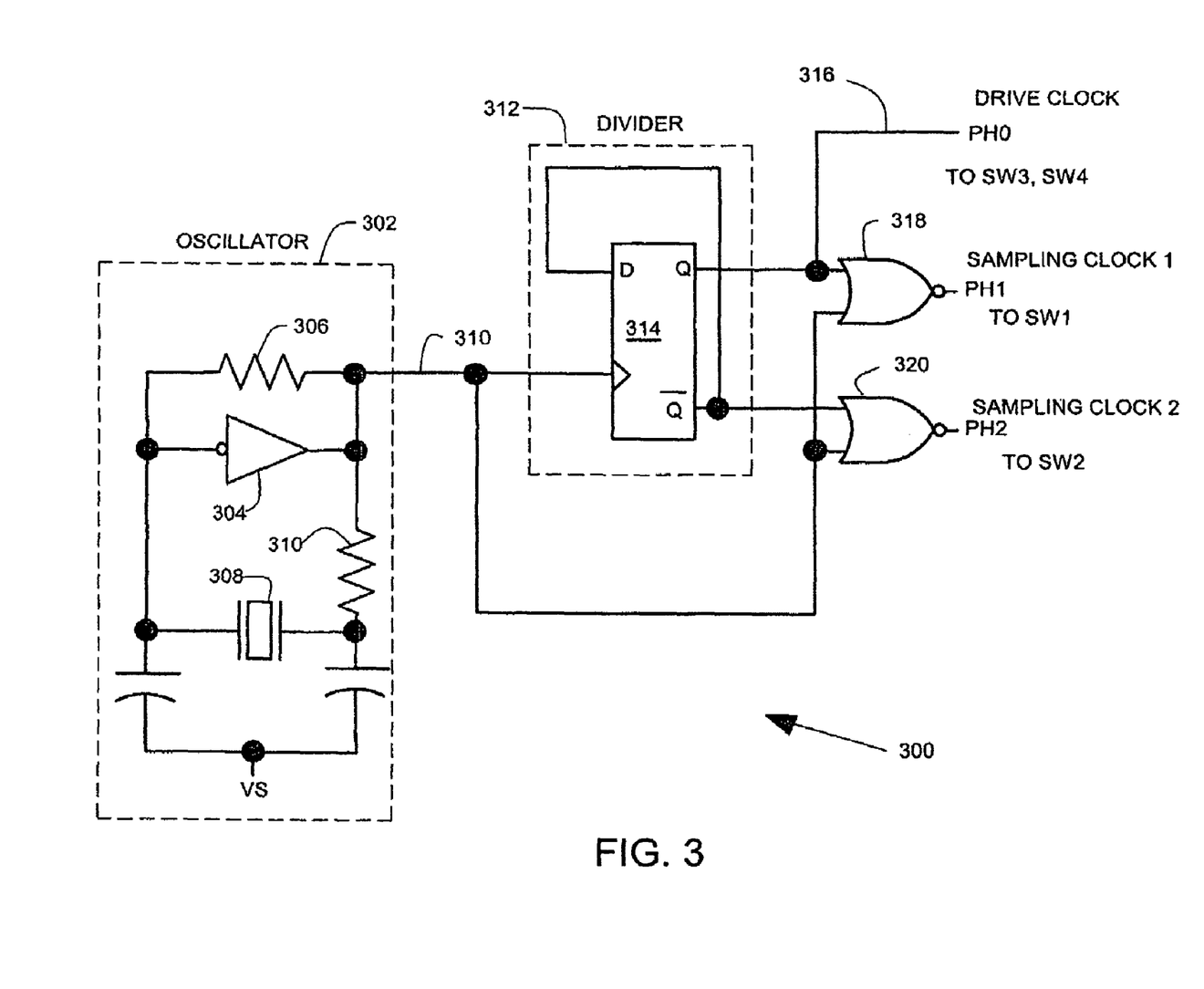
FIG. 3 illustrates an example of a clock generator circuit.

FIG. 3 illustrates an example of a clock generator circuit 300. Clock generator circuit 300 comprises a crystal controlled oscillator 302. The oscillator 302 includes an inverter 304 that has gain, and a feedback resistor 306 coupled between the input and output of the inverter 304. The feedback resistor 306 biases the inverter 304 in a range for analog amplification. A frequency control crystal 308 and a series resistor 310 are coupled in a feedback path between the input and output of the inverter 304. The crystal oscillator 302 oscillates at a frequency determined by the crystal 308. The oscillator produces an oscillator output 310. The oscillator output 310 comprises a close approximation of a square wave. In one embodiment, the frequency of oscillation of the crystal oscillator 302 is 2 MHz.

The clock generator circuit 300 comprises a frequency divider circuit 312. The divider circuit 312 comprises a flip-flop 314 (also called a clocked D latch). The /Q (not Q) output is coupled to the D input such that the flip-flop 314 operates as a divide-by-two circuit. The Q output of the flip-flop 314 is coupled out on line 316 as a drive clock (PHO) for driving control inputs of solid state switches (such as switches SW3, SW4 in FIG. 1). In one embodiment, the drive clock PHO has a frequency of 1 MHz. The ability to use a very high switching speed such as 1 MHz reduces errors due to poor insulation resistance and leakage caused by moisture. With the high frequency clock, the circuit is able to achieve fast response times to step changes in process variables. Response times can be as small as 2.5 milliseconds.

The clock generator 300 comprises two-input NOR gates 318, 320. One input of NOR gate 318 is coupled to the oscillator output 310, and the other input of the NOR gate 318 is coupled to the Q output of the flip-flop 314. The output of the NOR gate 318 comprises a sampling clock 1 (PH1) that couples to a detector (such as detector 110 in FIG. 1) to control a switch that performs synchronous demodulation. The sampling clock 1 is high during the latter half of drive clock phase 1. One input of the NOR gate 320 is coupled to the oscillator output 310, and the other input of the NOR gate 318 is coupled to the /Q output of the flip-flop 314. The output of the NOR gate 320 comprises a sampling clock 2 (PH2) that couples to a detector (such as detector 110 in FIG. 1) to control a switch that performs synchronous demodulation. The sampling clock 2 is high during the latter half of drive clock phase 2.

Figure 4:
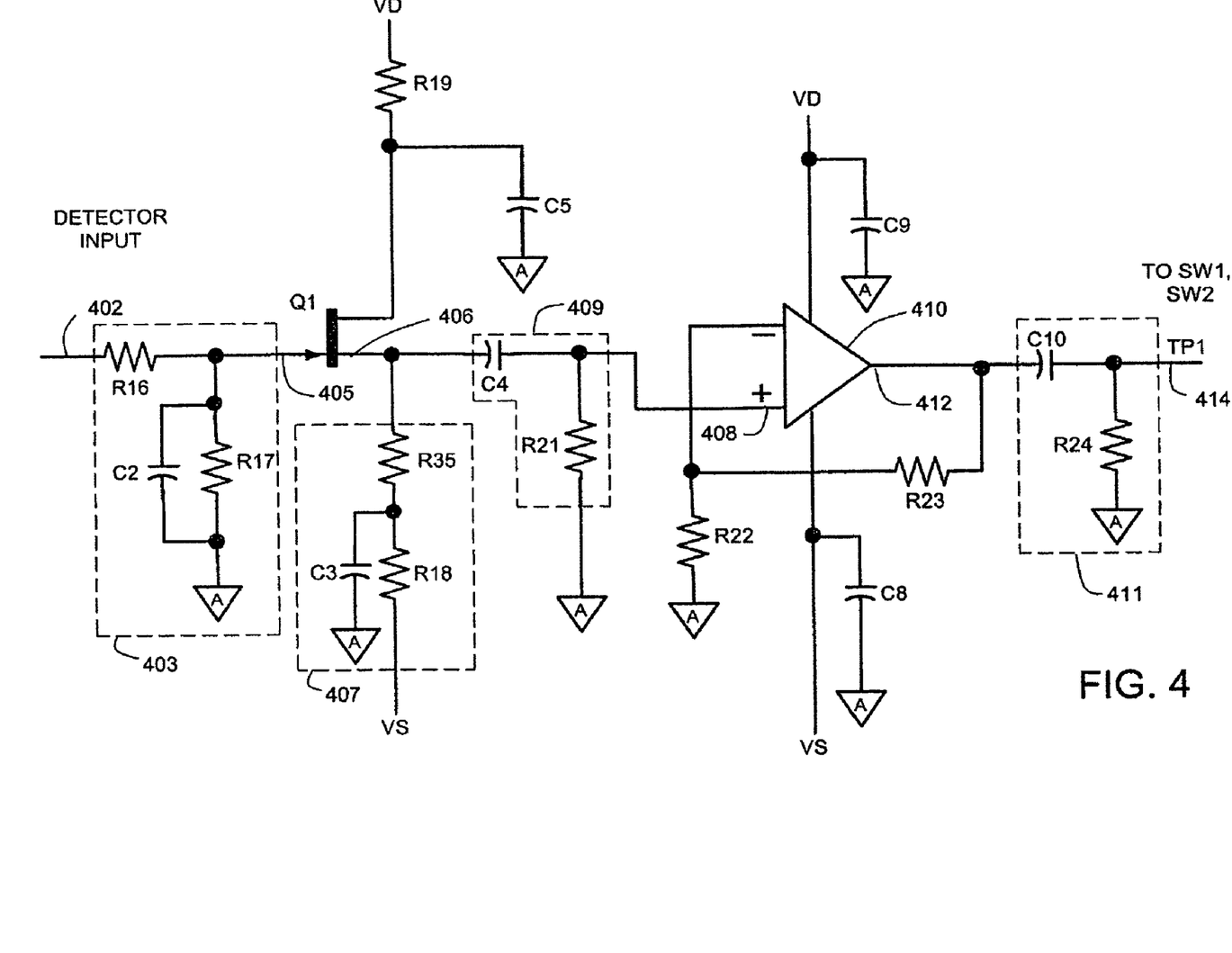
FIGS. 4-5, taken together, illustrate an example of a detector circuit.
Figure 5:
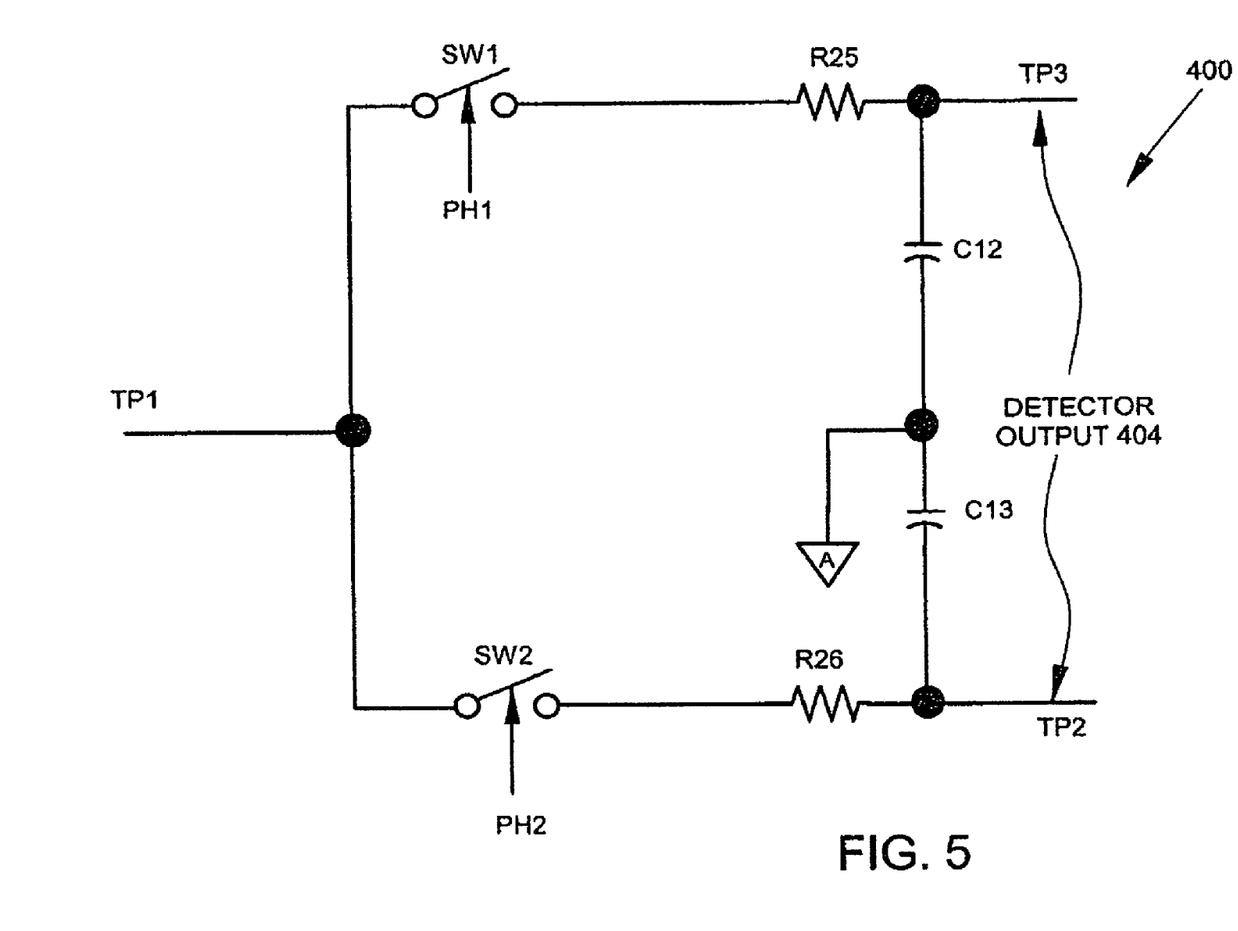

FIGS. 4-5, taken together, illustrate an example of a detector circuit 400. The detector circuit 400 comprises a detector input 402 at the left side of FIG. 4. The detector circuit 400 comprises a detector output 404 at the right side of FIG. 5. Test point TP1 at the right side of FIG. 4 is connected to test point TP1 at the left side of FIG. 5. The detector input 402 is coupled to a transistor input biasing network 403 comprising resistor R16, resistor R17 and capacitor C2. The transistor input biasing network 403 is coupled to a gate 405 of transistor Q1 which functions as an analog amplifier. The transistor input biasing network 403 has a low pass characteristic that filters out noise with frequencies higher than the carrier frequency range. In one embodiment, the transistor Q1 comprises an N channel JFET. In another embodiment, the N channel JFET comprises a Phillips type BF861. The Phillips BF861 has a desirable characteristic of noise levels of only 1.5 nanovolt per root hertz at a 1 MHz operating frequency, and low capacitance. The detector circuit 400 comprises a transistor output biasing network 407 that comprises resistors R35, R18 and C3. The transistor output biasing network 407 provides output bias for the transistor Q1.

An output 406 of the transistor Q1 coupled to an interstage coupling network 409 that comprises capacitor C4 and resistor R21. The interstage coupling network 409 has a high pass characteristic that filters out noise with frequencies lower than the carrier frequency range. The interstage coupling network 409 couples the output 406 to an input 408 of a high speed amplifier 410. In one embodiment, the high speed amplifier comprises an Analog Device type AD8005. The Analog Device type AD8005 has a low noise voltage of 6 nanovolt per root hertz at 1 MHz. The amplifier 410 comprises an amplifier output 412. The amplifier output 412 couples to a high pass network 411 that comprises capacitor C10 and resistor R24. The high pass network 411 filters out noise at frequencies that are lower than the carrier frequency range. In particular, the high pass network 411 filters out any DC offset that may be present at amplifier output 412. The high pass network 411 has an output TP1 at 414 that connects to TP1 in FIG. 5.

In FIG. 5, the output 414 (FIG. 4) connects to switches SW1 and SW2 at TP1 as illustrated. The switch SW1 is controlled by sampling clock PH1, and the switch SW2 is controlled by sampling clock PH2. The switch SW1 is controlled to close during a latter part of the first drive clock phase. When switch SW1 is closed, the output 414 is connected via the switch SW1 to a first low pass filter circuit comprising resistor R25 and capacitor C12. The switch SW2 is controlled to close during a latter part of the second drive clock phase. When switch SW2 is closed, the output 414 is connected via the switch SW2 to a second low pass filter circuit comprising resistor R26 and capacitor C13. The switches SW1, SW2 and the first and second integrators provide synchronous demodulation to a baseband detector output 404. The detector output 404 is a baseband potential with frequency response that is limited by the RC time constants of the first and second low pass filters. The detector output 404 is a differential voltage between test points TP3 and TP2 (FIG. 5) that is coupled to TP3 and TP2 in the control circuit 600 in FIG. 6.

Figure 6:
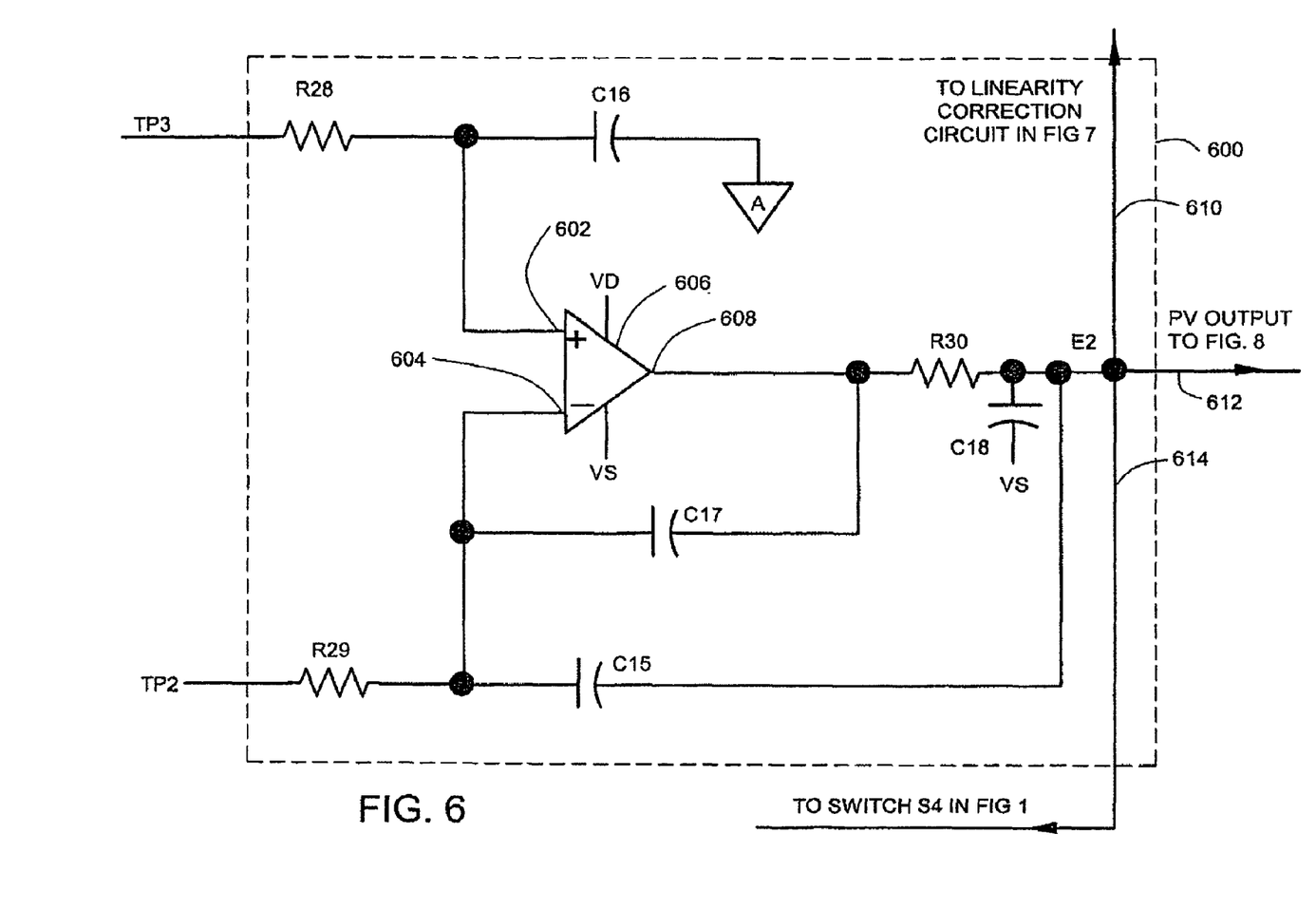
FIG. 6 illustrates an example of a control circuit that controls a baseband potential.

FIG. 6 illustrates an example of a control circuit 600 that controls the baseband potential E2. The differential voltage (detector output 404) between test points TP3 and TP2 is coupled to resistors R28, R29, respectively in FIG. 6. The differential voltage is applied through resistors R28, R29 to the inputs 602, 604 of integrated circuit amplifier 606. An output 608 of amplifier 606 is coupled through a resistor R30 to capacitor C18 and capacitor C15. Capacitor C15 is coupled in a feedback loop to the inverting input 604 of the amplifier 606. Capacitor C18 is couple to potential VS. The arrangement of the amplifier 606 and associated circuit components comprises an integrating amplifier which has as its output the baseband potential E2. The baseband potential E2 couples along line 610 to a linearity circuit such as the linearity circuit illustrate in FIG. 7. The baseband potential E2 couples along line 612 to a scaling circuit such as scaling circuit 800 illustrated in FIG. 8. The baseband potential E2 is coupled along line 614 to switch S4 in FIG. 1.

Figure 7:
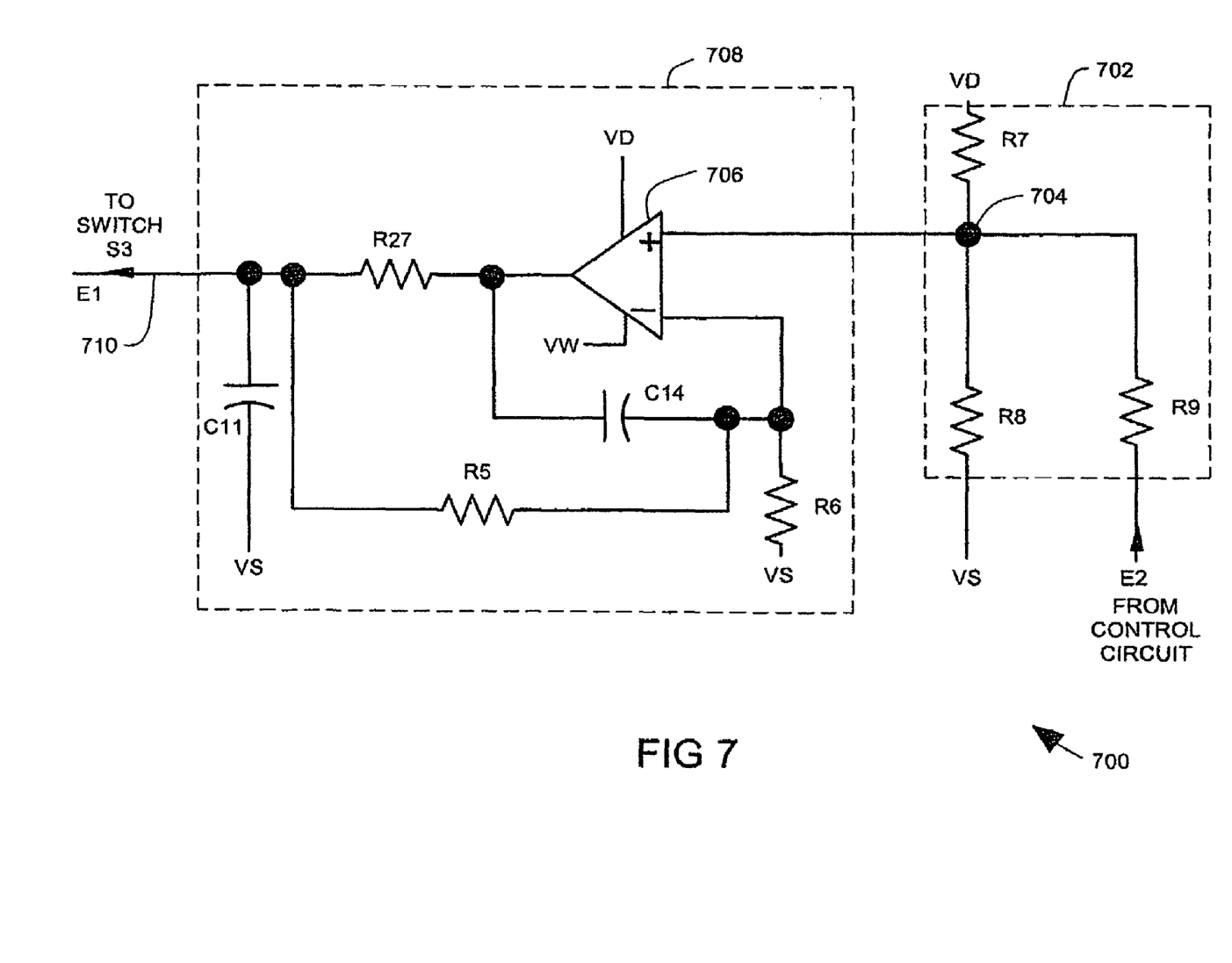
FIG. 7 illustrates an example of a linearity correction circuit.

FIG. 7 illustrates an example of a linearity correction circuit 700. The linearity correction circuit comprises a resistive network 702 that comprises resistors R7, R8 and R9. The resistor R7, R8 form a resistive voltage divider that is connected in series between potential difference (VD−VS) and that has a divider output node 704. Resistor R9 couples between the divider output node and baseband potential E2 (line 610 in FIG. 6).

In one embodiment, the resistor R7 has a resistance of 25 Kohms and the resistor R8 has a resistance of 68 Kohms. Approximately 73% of the potential difference (VD−VS) develops across resistor R8, and about 27% of the potential difference (VD−VS) develops across resistor R7. In this embodiment, the resistor R9 has a resistance of 432 Kohms. The resistance of resistor R9 is about 24 times the source resistance of the resistive bridge which is about 18 Kohms. Variations in the baseband potential E2, which is connected to the resistive divider by R9, are thus able to "pull" the potential at node 704 by only a small amount. An amplifier 706 receives the potential at node 704 as an input. The amplifier 706 is connected with resistors R27, R5, R6 and capacitors C14, C11 as a non-inverting amplifier 708. The amplifier 708 generates the baseband potential E1 on line 710. The baseband potential E1 is a function of VD and E2. Line 701 couples to switch SW3 (FIG. 1). In instances where linearity correction is not needed, the resistor R9 can be omitted, leaving the connection from node 704 to E2 open circuited.

Figure 8:
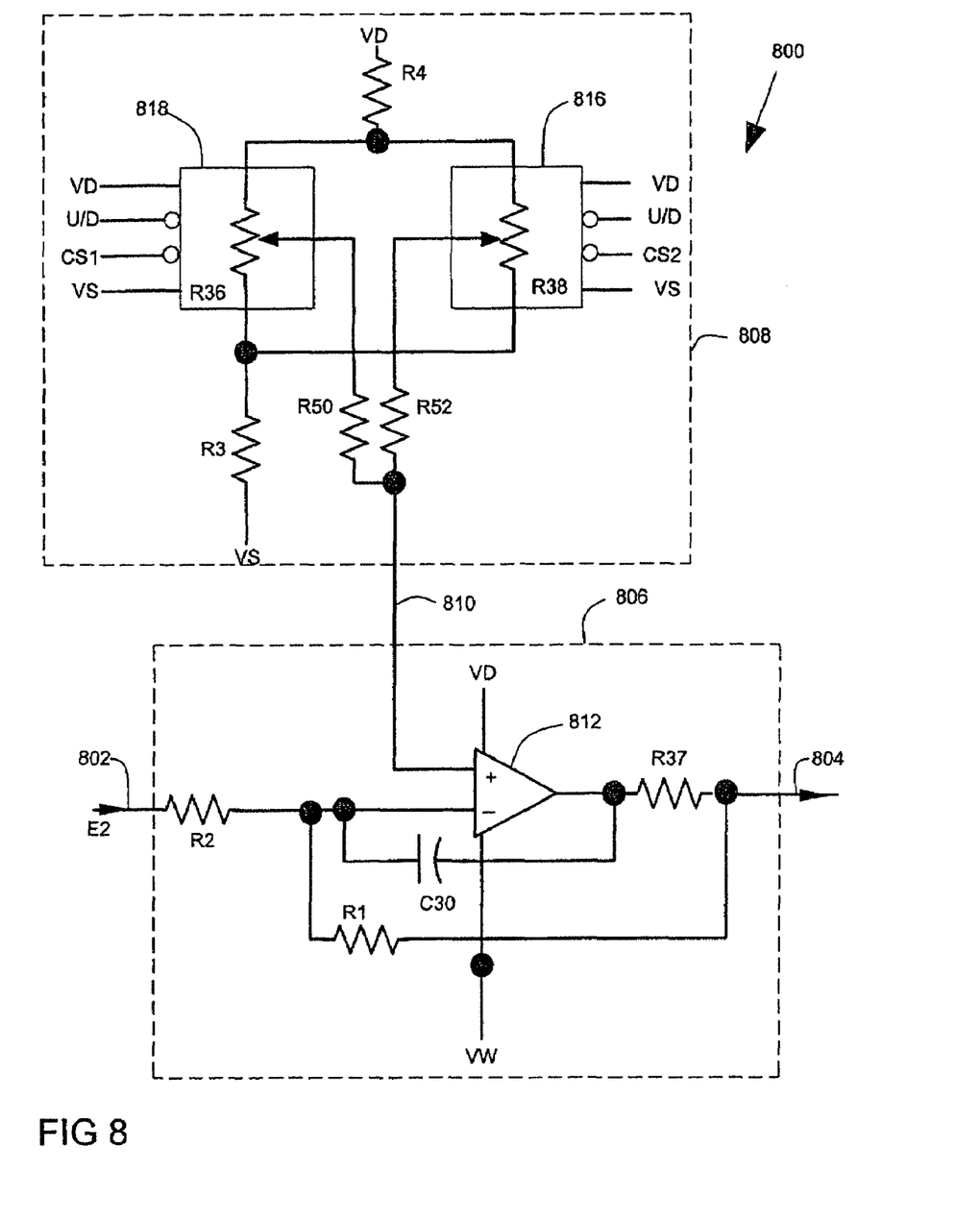
FIG. 8 illustrates an example of a scaling circuit and zero adjusting circuit.
Figure 9:
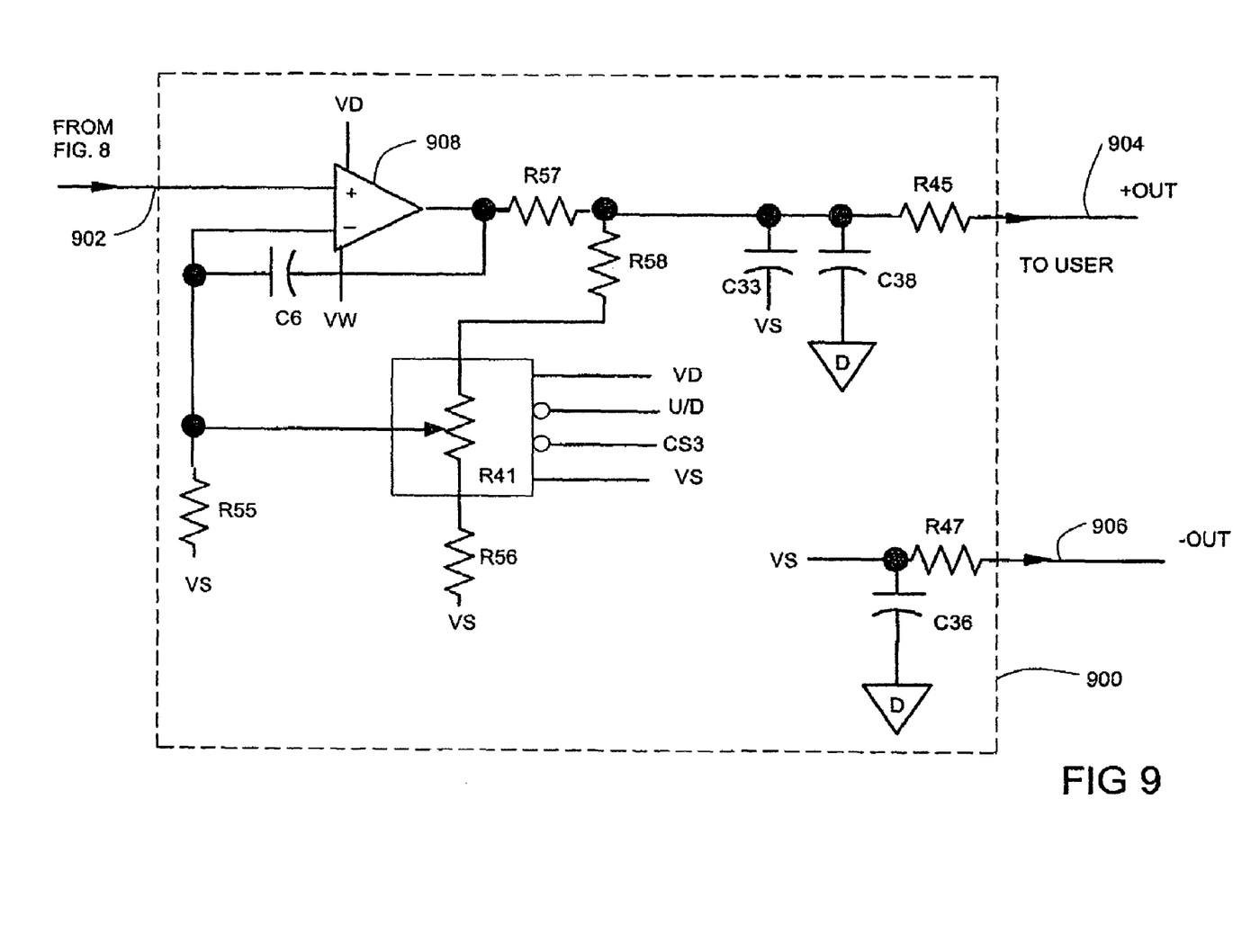
FIG. 9 illustrates an example of a span-setting circuit.
Figure 10:
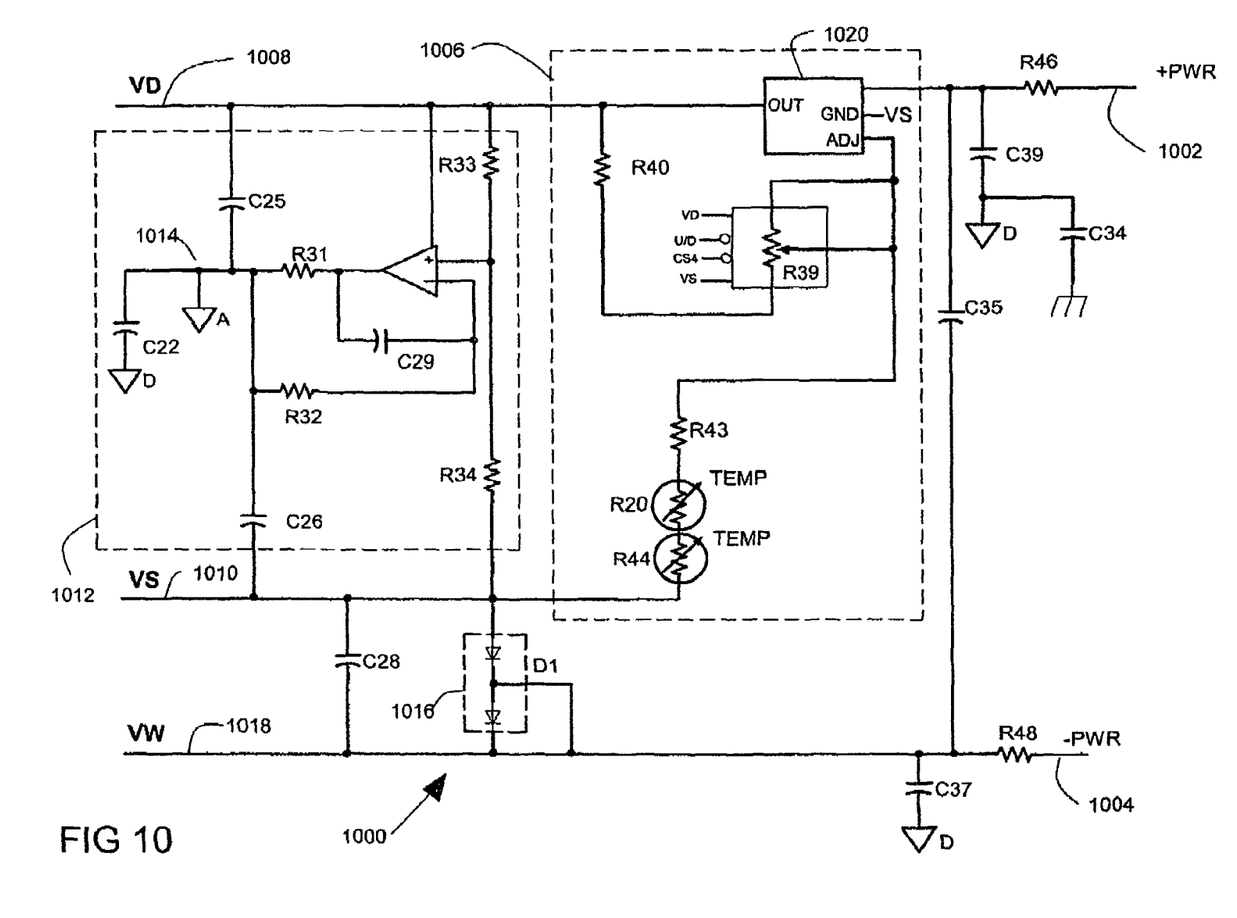
FIG. 10 illustrates an example of a regulator circuit.

FIGS. 8-10 are schematic diagrams of a circuit that can be coupled to the circuit illustrated in FIG. 1. The circuit illustrated in FIGS. 8-10 interfaces with a control system that provides power and receives a useful output from the sensor circuit. A scaling circuit 800 illustrated in FIG. 8 receives the output representing the process variable (line 132 in FIG. 1). The circuit 800 inverts, adjusts zero point and scales in order to provide a scaled output that increases with an increasing sensed process variable. A span circuit 900 illustrated in FIG. 9 receives the scaled output from the scaling circuit 800. The span circuit 900 provides a coarse adjustment of a setting for span. A regulator circuit 1000 in FIG. 10 provides a fine setting for the output span and provides temperature compensation for the output span.

FIG. 8 illustrates an example of the scaling circuit 800. The scaling circuit 800 receives the baseband potential E2 (from line 612 in FIG. 6) on line 802. The scaling circuit provides a scaled output on line 804. The scaled output on line 804 is couplable to line 902 in FIG. 9.

The scaling circuit comprises an inverting amplifier 806. The inverting amplifier 806 comprises an integrated circuit amplifier 812, resistors R1, R2, R37 and capacitor C30. In one embodiment, R1=R2 and the amplifier circuit has a gain of minus one.

The amplifier 812 has a positive input that is coupled along line 810 to a zero-setting circuit 808. The zero-setting circuit comprises a resistive network that includes adjustable resistances 816, 818. In one embodiment, the adjustable resistances 816, 818 comprise electronic potentiometers. In another embodiment, the adjustable resistances 816, 818 comprise a non-volatile digital pot type MCP4021 manufactured by Microchip Technology Inc of Chandler, Ariz., USA. The zero-setting circuit can be used, for example, to provide a zero output at zero pressure when the process variable sensed is pressure. In another embodiment, resistor R52 comprises a thermistor to provide temperature correction for zero temperature errors.

FIG. 9 illustrates an example of the span-setting circuit 900. The span-setting circuit 900 adjusts gain to provide a full scale electrical output for a selected measurement range of the process variable. For example, when the process variable is pressure, the span may be set such that an output change of 5 volts is provided for a process variable change of 100 psi.

The span-setting circuit 900 receives the output (line 804 in FIG. 8) of the scaling circuit 800. The span-setting circuit 900 provides a user output at 904, 906. The span-setting circuit 900 comprises an integrated circuit amplifier 908. The integrated circuit amplifier 908 is connected with resistors R47, R55, R56, R57, R58, R41 and capacitors C6, C33, C36, C38 to form a non-inverting amplifier with an adjustable gain. Resistor R41 comprises an adjustable potentiometer for adjusting the gain. In one embodiment, the resistor R41 comprises a non-volatile digital pot type MCP4021.

The gain of the span-setting circuit 900 provides a coarse setting for gain, while a fine adjustment of gain can be made by adjusting the level of VD as described in more detail below in connection with an example shown in FIG. 10. As the level of VD is adjusted, the operating point of the linearity correction circuit (FIG. 7) shifts, which finely adjusts gain in sensing the process variable. The linearity correction circuit provides the potential E1 as a function of VD. In an embodiment where linearity correction is provided, E1 is also a function of E2.

FIG. 10 illustrates an example of a regulator circuit 1000. The regulator circuit 1000 receives energization from an external control system power bus at leads 1002, 1004. In one embodiment, the power supplied is a current in the range of 3.45 to 3.65 milliamperes at about 7 volts or more.

The regulator circuit 1000 comprises a VD regulator 1006 that is energized from conductors 1002, 1004. The VD regulator 1006 generates the DC power supply potential VD on line 1008 relative to a reference power supply potential VS on line 1010. In one embodiment, VD is nominally 5.5 volts. The power supply potential VD is temperature compensated by thermistors R20, R44. The power supply potential VD is adjustable by adjustable resistor R39. In one embodiment, the adjustable resistor R39 comprises a non-volatile digital pot type MCP4021. The potential VD is regulated by integrated circuit regulator 1020. In one embodiment, the integrated circuit regulator 1020 comprises a voltage regulator type LT1121 from Linear Technology Corporation in Milpitas, Calif., USA.

The regulator circuit 1000 comprises an analog ground voltage regulator 1012. The analog ground voltage regulator 1012 generates an analog ground potential on line 1014. The analog ground on line 1014 is maintained at a level set by a voltage divider comprising resistors R33, R34.

The regulator circuit 1000 comprises a VW regulator 1016 that is energized by current that has passed through the VD-VS power supply system, The VW regulator 1016 generates the power supply potential VW on line 1018. The potential VW is negative with respect to the VS reference. The VW regulator 1016 is connected in series with the VD-VS power system. In one embodiment, the VW regulator 1016 comprises a type BAV99 diode from Fairchild Semiconductor in South Portland, Me., USA, and the potential VW is approximately −0.7 relative to the reference potential VS.

Figure 11:
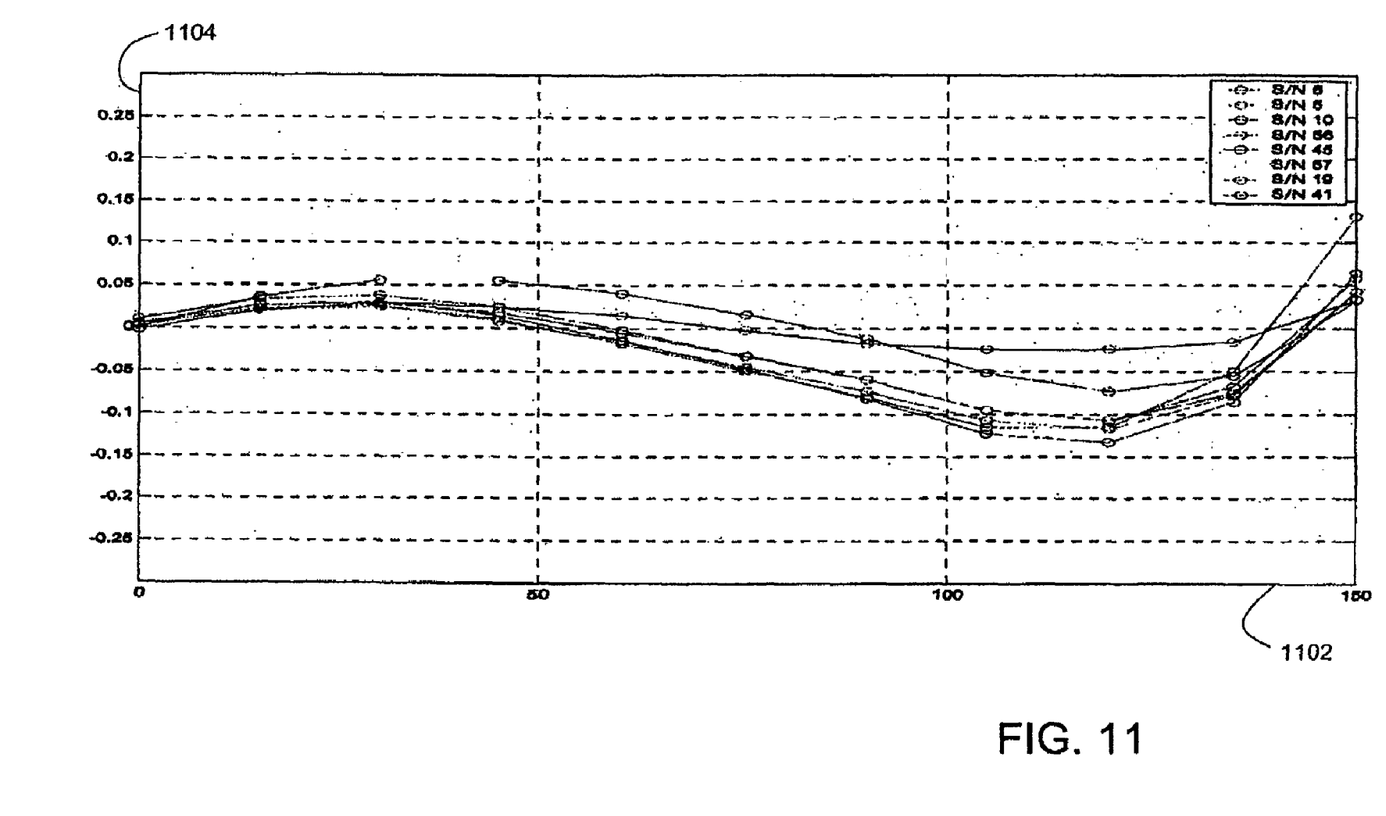
FIG. 11 illustrates a graph of percentage error as a function of process variable for a pressure sensing circuit at room temperature.

FIG. 11 illustrates a graph of percentage error in potential E2 as a function of process variable for a pressure sensing circuit at room temperature. A horizontal axis 1102 represents pressure in pounds per square inch absolute (PSIA). A vertical axis 1104 represents percentage of error (non-linearity) in the potential E2 for eight sample pressure sensing circuits. In the results shown in FIG. 11, the percentage errors shown are percent of full scale errors. As can be seen in FIG. 11, the linearity correction circuit has corrected a large amount of non-linearity, and the individual sample circuits generally have room temperature error percentages on the order of +/−0.1% error.

Figure 12:
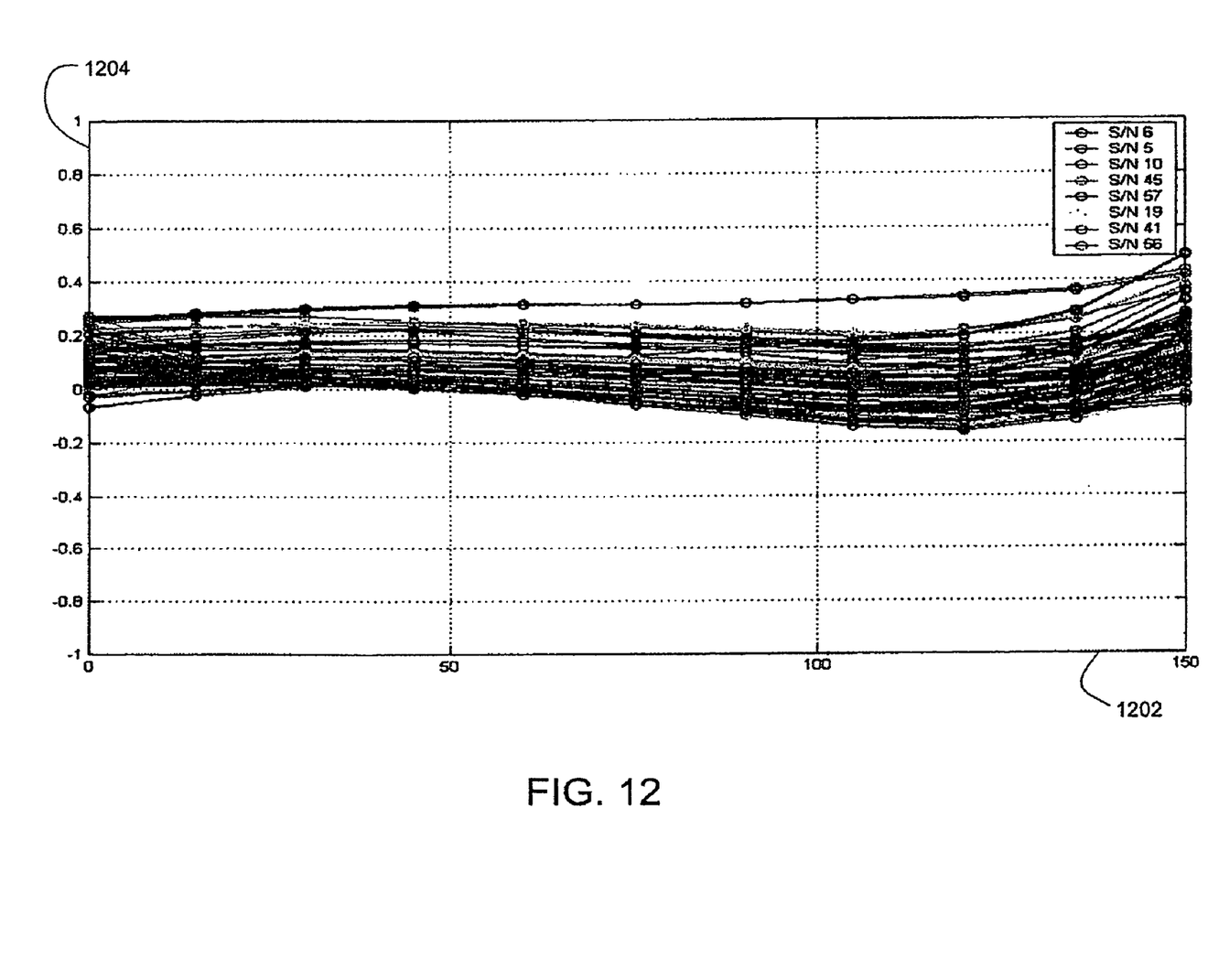
FIG. 12 illustrates a graph of percentage error as a function of process variable for a pressure sensing circuit over an operating temperature range.

FIG. 12 illustrates a graph of percentage error in potential E2 as a function of process variable for a pressure sensing circuit over a −40 degrees to +85 degrees Centigrade operating temperature range. A horizontal axis 1202 represents pressure in pounds per square inch absolute (PSIA). A vertical axis 1204 represents percentage of error (non-linearity) in the potential E2 for eight sample pressure sensing circuits. In the results shown in FIG. 12, the percentage errors shown are percent of full scale errors. As can be seen in FIG. 12, the linearity correction circuit has corrected a large amount of non-linearity, and the individual sample circuits generally have temperature error percentages on the order of +/−0.5% error.

In operation, the baseband potentials E1, E2 are controlled such that the ratio E2/E1=Csense/Creference. The ratio E2/E1 can be digitized by A/D converters with E1 as reference and E2 as signal.

The sensing circuits can be used for all types of capacitive sensors such as accelerometers, inclinometers, temperature sensors with a capacitive sensor, and load cells. With the addition of an AD converter and a micro, the accuracy of the system can be improved and full characterization of the sensor can be achieved.

With a capacitive sensor, the sense capacitance Cs capacitor can follow a function approximated by Cs=Co/(1−a*P/Pfs). Where Pfs is full scale capacitance and Co is zero pressure capacitance. A is approximately 0.5. The circuit will give the relationship of E2/E1=Cr/Cs. This translates into E2/E1=Cr*(1−a*P/Pfs)/Co, which shows essentially a linear relationship with pressure. However, an actual capacitive pressure sensor has about a 0.75% of full scale (upper range limit, URL) non-linearity and it is not parabolic. The circuit linearity correction is parabolic and some third degree error of 0.10% is left after the correction.

The circuit starts with two single pole double throw switches that switches the series combination of Cr and Cs between E1 (approximately fixed) and Vs, to E2 (variable) and Vs. The tap between the two capacitors is the signal and E2 is adjusted to make the AC signal point zero voltage.

The detector input is first passed through an N-channel JFET source follower to reduce the impedance to input to the high speed amplifier. A high pass filter on the JFET output removes the DC and filters any low frequency noise. The demodulation operates on the last half of each cycle of PHO to eliminate the switching transients developed during the cycle switching.

Although the present invention has been described with reference to preferred embodiments, workers skilled in the art will recognize that changes may be made in form and detail without departing from the spirit and scope of the invention.

What is claimed is:

1. A circuit sensing a process variable, comprising:
   a voltage divider that includes first and second capacitors, at least one of which has a capacitance that is varied by the process variable in a baseband frequency range; the divider having divider ends that receive modulated potentials that have modulation in a carrier frequency range and that have a baseband envelope; the divider having a center tap connection that provides a detector input;
   a detector with a detector output representative of carrier frequency range components of the detector input; and
   a control circuit that controls the baseband envelope of the modulated potentials as a function of the detector output, the control circuit providing a process variable output in the baseband frequency range;
   wherein the first capacitor comprises a process variable sensing capacitance, and the second capacitor comprises a capacitance that is substantially insensitive to the process variable;
   wherein the control circuit controls at least one of the modulated potentials as a non-linear function of the detector output, compensating the process variable output for a non-linerity with respect to the process variable.

2. The process variable sensing circuit of claim 1 wherein the envelopes of the modulated potentials have variations at the baseband frequencies that combine with the capacitance variation at baseband frequencies to generate the detector input in a way that tends to rebalance toward a balanced condition when the process variable is stable within the baseband.

3. The process variable sensing circuit of claim 1 wherein the detector input includes baseband noise, and the detector filters out the baseband noise.

4. The process variable sensing circuit of claim 1 wherein the detector comprises:
   a filter having a filter output and having a bandpass that includes the carrier frequency; and
   a synchronous demodulator receiving the filter output and demodulating the filter output to provide the detector output.

5. The process variable sensing circuit of claim 4, comprising:
   a clock generator that generates clock outputs; and
   the synchronous demodulator demodulating as a function of at least one of the clock outputs.

6. The process variable sensing circuit of claim 5, comprising:
   switches controlled by at least one of the clock outputs that modulate the modulated potentials.

7. The process variable sensing circuit of claim 4 wherein the filter comprises a multistage amplifier.

8. The process variable sensing circuit of claim 1 wherein the first capacitor comprises a first electrode deposited on a first substrate, and the second capacitor a second electrode deposited on the first substrate.

9. The process variable sensing circuit of claim 8 wherein the first and second capacitors include electrode connections to the detector input.

10. The process variable sensing circuit of claim 9 wherein the electrode connections to the detector input are free of connections to switches.

11. The process variable sensing circuit of claim 1 wherein the carrier frequency is a fixed carrier frequency.

12. The process variable sensing circuit of claim 1 wherein the baseband frequencies are in a frequency range of less than 10 hertz, and the carrier frequency is greater than 1 kilohertz.

13. The process variable sensing circuit of claim 12 wherein the process variable sensing capacitance is responsive to baseband process variable variations up to at least 400 hertz, and the process variable output is responsive to process variable variations up to at least 400 hertz.

14. A method of sensing a process variable, comprising:

modulating modulated potentials at a carrier frequency;

providing the modulated potentials to first and second capacitors that couple to a detector input, wherein the first capacitor comprises a process variable sensing capacitance, and the second capacitor comprises a capacitance that is substantially insensitive to the process variable;

varying a capacitance of one of the first and second capacitors by applying a varying process variable at baseband frequencies;

detecting, at the carrier frequency, a detected representation of the detector input; and controlling baseband envelopes of the modulated potentials as a function of the detected representation;

controlling at least one of the modulated potentials as a non-linear function of the detected representation to compensating the detected representation for a non-linearity of the capacitance as a function of the process variable.

15. The process variable sensing method of claim 14 and comprising:

varying the amplitudes of the modulated potentials at the baseband frequencies in order to combine with the capacitance variation at baseband frequencies such that the detector input tends to balance when the process variable is stable within the baseband.

16. The process variable sensing method of claim 14 wherein the detector input includes baseband noise, and filtering out the baseband noise in the detecting.

* * * * *